March 10, 1925.

N. P. BACH

1,529,416

CAN CAPPING AND MARKING MACHINE

Filed March 11, 1922     8 Sheets-Sheet 5

INVENTOR
Niels P. Bach
BY his ATTORNEYS
Darby & Darby

March 10, 1925.

N. P. BACH

CAN CAPPING AND MARKING MACHINE

Filed March 11, 1922

INVENTOR
Neils P. Bach
BY his ATTORNEYS
Dailey & Dailey

Patented Mar. 10, 1925.

1,529,416

UNITED STATES PATENT OFFICE.

NEILS P. BACH, OF MILLBURN, NEW JERSEY, ASSIGNOR, BY MESNE ASSIGNMENTS, TO THERMOKEPT CORPORATION, A CORPORATION OF DELAWARE.

CAN CAPPING AND MARKING MACHINE.

Application filed March 11, 1922. Serial No. 543,126.

*To all whom it may concern:*

Be it known that I, NEILS P. BACH, a subject of the King of Denmark, and resident of Millburn, county of Essex, and State of New Jersey, have made a new and useful Invention in Can Capping and Marking Machines, of which the following is a specification.

This invention relates to machines for automatically stamping, supplying and loosely attaching covers to cans that have been filled and are ready for capping, treating and sealing.

The prime object of my invention includes the production of a machine which is automatic and certain in operation and which will select a cover, mark it and apply it to a can as the can is moved past the cover-supplying station.

Another object includes the provision of an automatically operated dating or marking mechanism for dating or marking each cover applied.

Another object includes shaping or rounding the cans.

A further object includes the provision of cover-attaching mechanism for attaching the cover loosely in place.

Other objects will appear hereinafter, and I attain these objects by the mechanism illustrated in the accompanying drawings in which—

Fig. 9 is a plan view of the cover feed mechanism and stamp marker.

Similar numerals refer to like parts throughout the several views.

In general my cover-applying machine is adapted to handle a continuous succession of cans which have been filled and are ready for capping, treating and sealing. The cans are fed to the machine which automatically spaces them, moves them through a capping station where a cover is automatically marked and placed thereon, and then on to the cover-applying station, and means for loosely attaching the cover to thereafter permit the cans and contents to be subjected to final treating or processing, as vacuumizing, etc., and to sealing. As will appear more fully hereinafter, my machine is admirably adapted to be operated in conjunction with treating and sealing machines, or it may be operated independently if desired.

Referring now to the drawings, the cans are fed onto the initial carrier disk 20 at the assorting and spacing area or station A, for proper spacing and for other purposes, as will be stated more fully below. The cans then move to the cover, or cap applying and marking station or area B, and thence to the cover securing and crimping station or area C, and on, as stated above.

The disk 20 carries a spacer member 21, which is provided with spacer arms 22 for the purpose stated above. Both the spacer member and the spacer arms are united with the initial carrier disk by a drive shaft 23, which shaft also carries a drive gear 24 and is mounted in a suitable bearing 25 of the main frame or support 26. This frame or support may be a unit casting, or similar structure, for properly supporting the several elements and operating parts, as outlined above, and as is fully disclosed by the drawings and described below.

Figure 1:
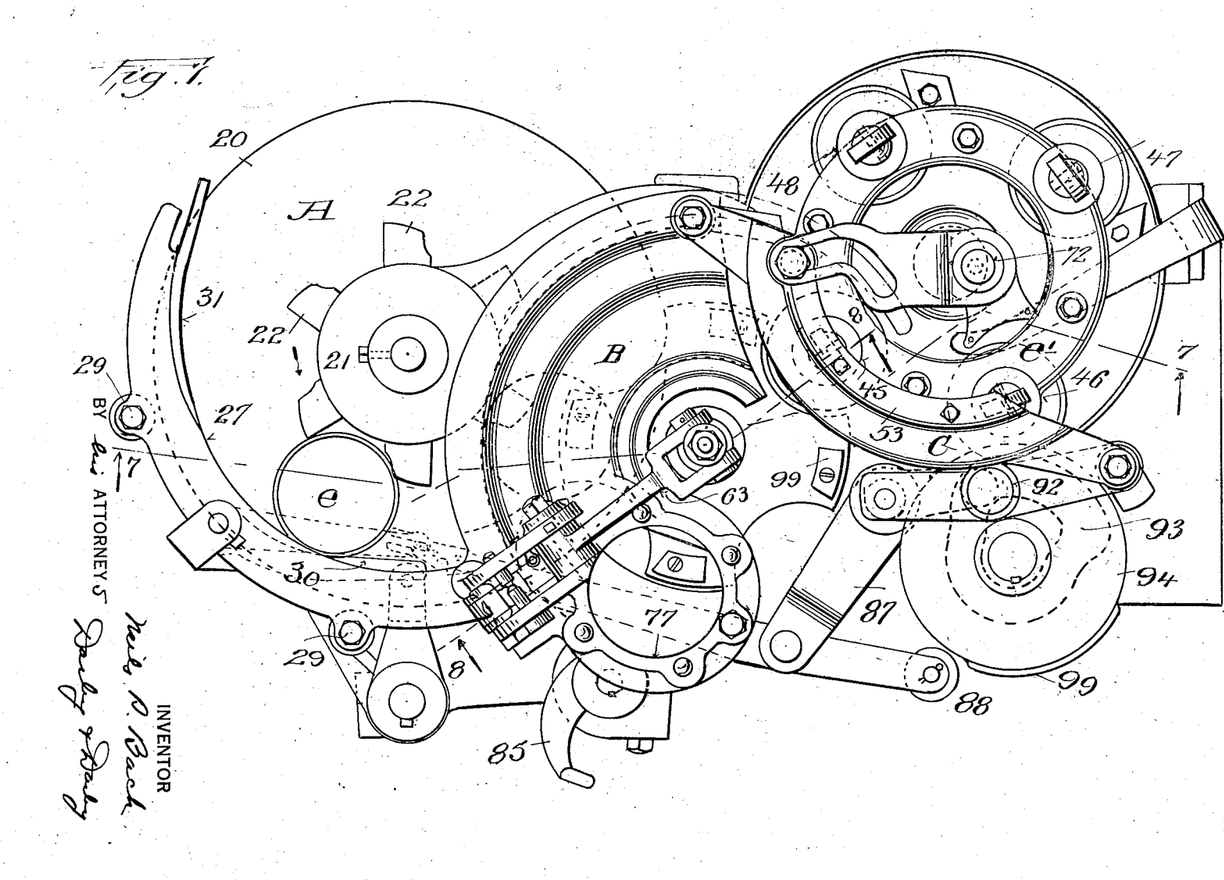
Figure 1 is a plan view.
Figures 2, 3:
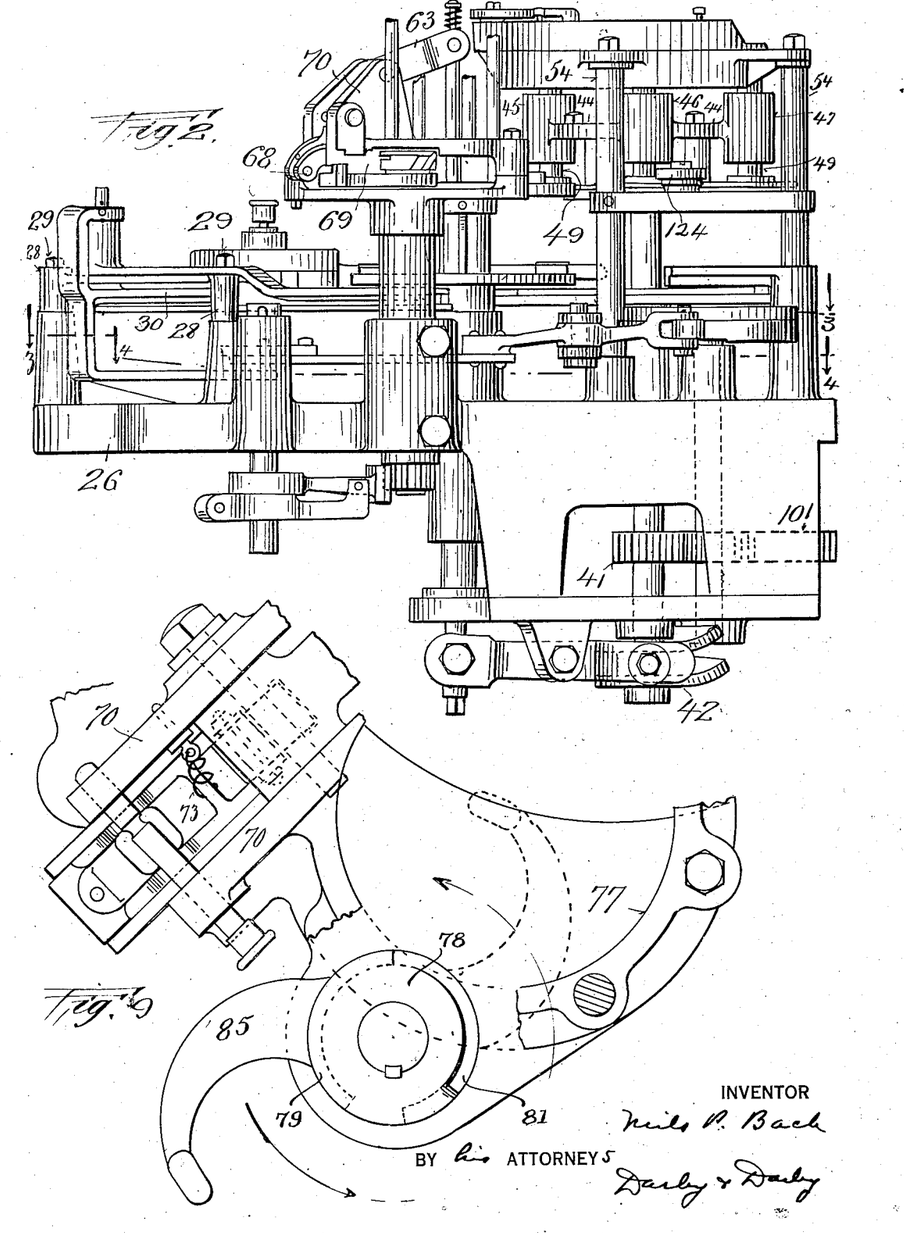
Fig. 2 is a side elevation.
Fig. 3 is a view taken on lines 3—3 of Fig. 2, looking in the direction of the arrows.
Figure 3:
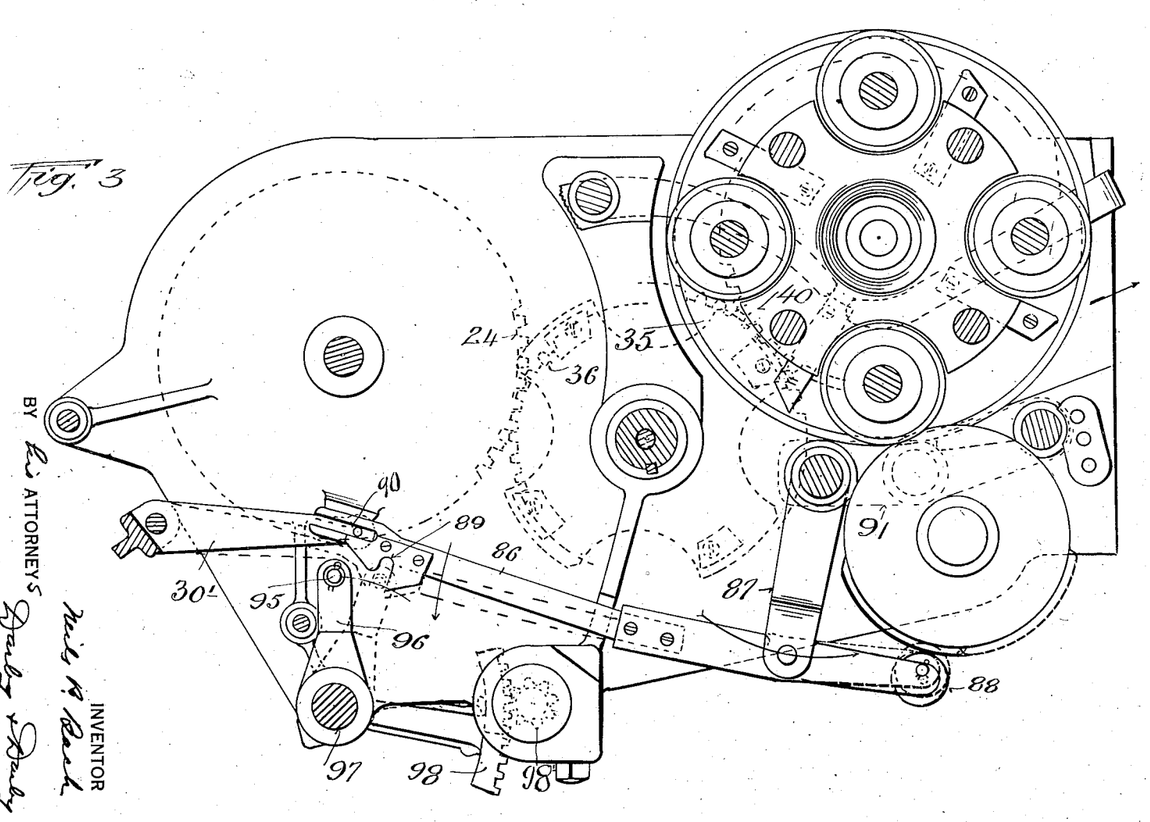

As is best shown in Figs. 1 and 2, the spacer arms are adapted to move the can *e* along a guide or rail 27 which is supported on the main frame by suitable supports 28, and securing bolts 29. Projecting into the path of the can is a trip lever 30 and a re-set finger 31 for putting into operation the cover feed mechanism, as is more fully described hereinafter.

Adjacent to the initial carrier disk (see Fig. ... and cooperating therewith, is an intermediate member for moving the cans through station B. This member comprises essentially spaced star elements 32 and 33 which are secured on a hollow shaft 34. This shaft is properly supported in the main frame and carries drive gears 35 and 36. A third and final member for shaping and for moving the cans through station or area C, comprises essentially a main supporting disk 37 and a star disk 38, both of which are secured in proper spaced relation to a hollow drive shaft 39 which is carried on the main support or frame, and has secured thereto drive gear 40. Within the hollow shaft 39 and extending therethrough is a solid drive shaft 39' which is journaled therein and in the bearing 71 on the main frame. This shaft has attached thereon an intermediate gear 41 and at the lower end a cam 42. Extending beyond the upper part of the hollow shaft 39 is an eccentric 72, for the purpose hereinafter stated.

At the upper end of the hollow drive shaft 39 there is secured a housing or plunger carrier 43, which carrier is provided with four carrier arms 44 extending at right angles, and each arm carries a plunger housing numbered 45, 46, 47 and 48, respectively. A plunger 49 operates within each housing and carries at one end a cover-depressing disk 50, and at the other a roller 51. This roller bears against the track 52 for depressing the plungers and disks to seat and hold the can cover in place while the cover is crimped in the manner stated below.

Track 52 is secured to a frame 53, which is held in place by any convenient means, as standards 54. A retracting spring 55 located within the plunger housing, and a guide plunger 56, operating within a groove 57, positively retracts the plunger and disk after the cover has been attached to the can.

Figures 7, 10, 11:
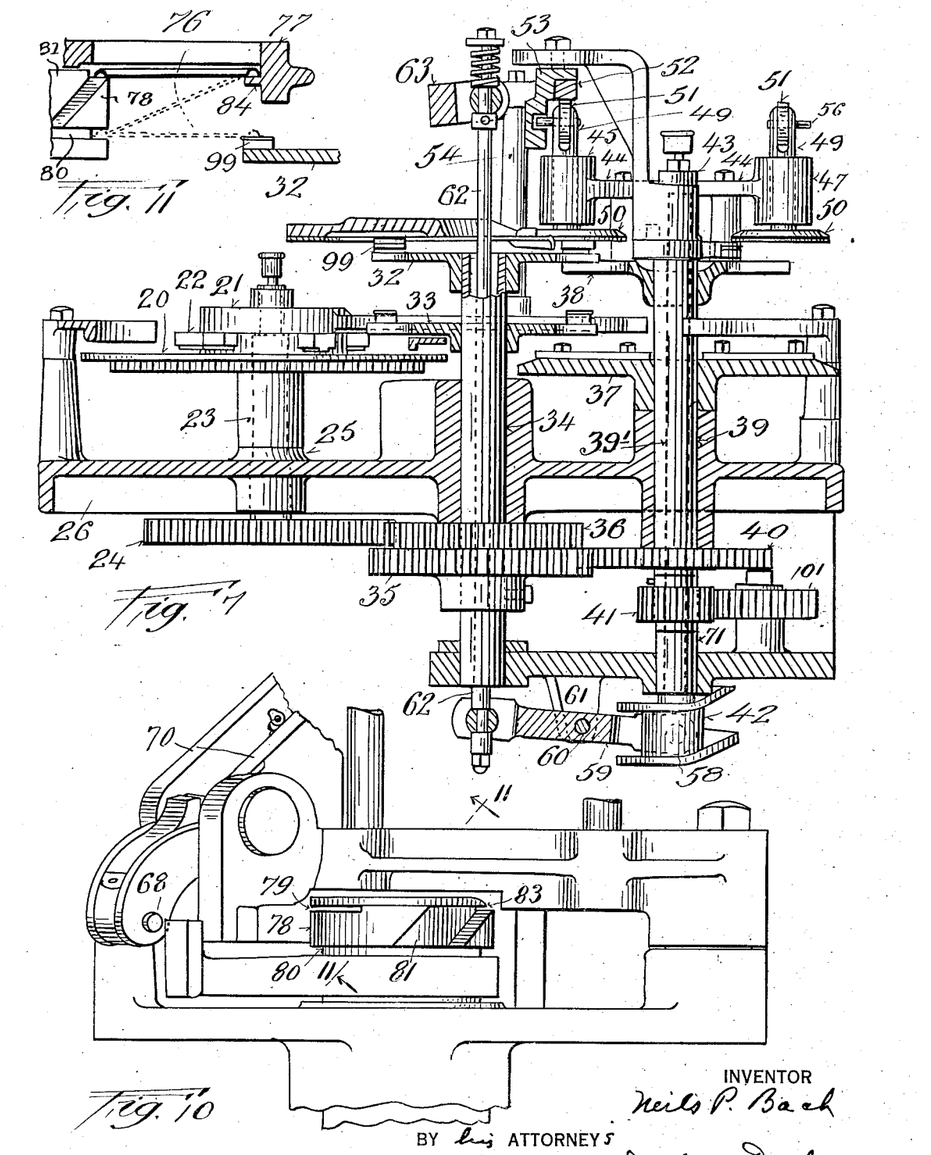
Fig. 7 is a view taken on lines 7—7 of Fig. 1.
Fig. 10 is a view in elevation showing the cover-releasing mechanism.
Fig. 11 is a view on lines 11—11 of Fig. 10.
Figures 8, 12, 13:
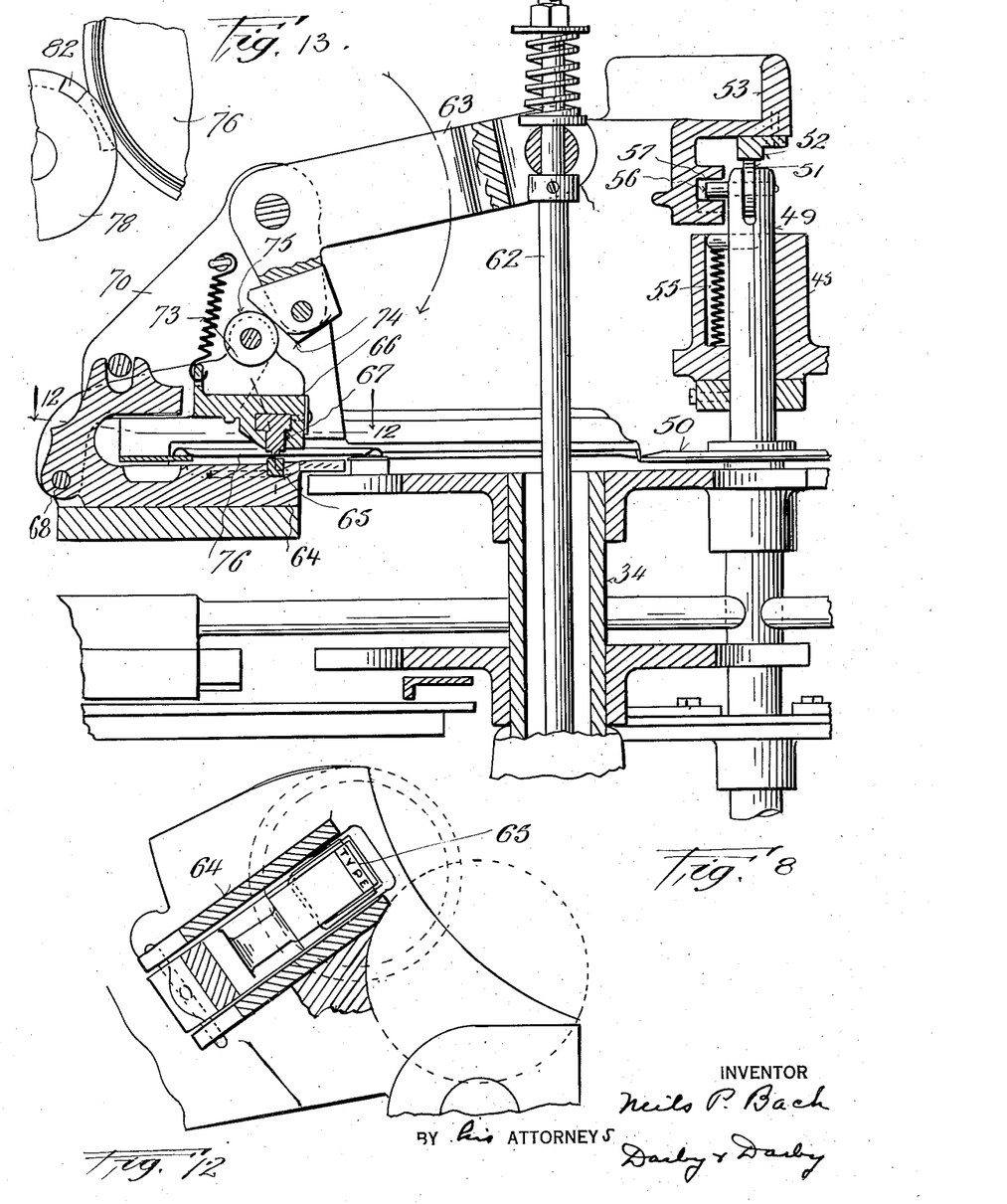
Fig. 8 is a view taken on lines 8—8 of Fig. 1, showing the stamping mechanism.
Fig. 12 is a view taken on lines 12—12 of Fig. 8.
Fig. 13 is a view showing the relation of the cover and the cover-releasing cylinder.

Referring now to the stamping and marking mechanism, the stamp operating roller 58 operates within cam 42 and is carried on one end of the lever arm 59, which arm is fulcrumed at 60 on the lever support 61. Pivotally carried at the other end of the lever arm is a stamp operating rod 62 which extends through the hollow shaft 34 and is connected to the stamp operating lever arm 63 for operating the dating stamp or marker. This stamp or marker consists essentially of a bed plate 64, for holding suitable type 65, and the impressing or stamping member 66 for supporting a proper matrix 67. The impressing member is mounted on the bed plate by a pivot 68, and both the bed plate and the impressing member are firmly supported in an anchor block 69, having supporting sides 70 for pivotally holding the stamp arm lever and for guiding the impressing member. A retracting spring 73, tends to hold the impressing or stamping member in open position, and the effective cam 74, on the end of the lever arm 63 engages the roller surface 75 for depressing the stamping member, to impress the date or suitable legend on the cover 76 as the cover is moved into position from the cover release and feed station 77. This station is arranged for holding a supply of covers, from which source the covers are selectively fed or released by the selector or feed cylinder 78. This cylinder is provided with circumferentially extending grooves 79 and 80, and a lateral depression or channel 81. The disk edge formed by the groove 79 is provided with an opening 82 with a cover picking edge 83 for selecting a single cover and moving it to the temporary shelf 84, prior to guiding it down the incline or depression channel as the cylinder rotates. The successive positions of the cover are best indicated in Fig. 11, and the feed cylinder is best illustrated in Figs. 10 and 13. As the cover reaches its lower position the cover projecting arm 85 moves it into the stamping position from whence it is then moved onto the can in the manner described below.

The cover release and feed mechanism is thrown into operation by a tripping mechanism which comprises essentially an oscillating trip lever or pitman 86 which is supported at or near one end by a cam lever 87 and having a cam surface or roller 88. The other end of this lever is provided with horizontal slot 89 and a longitudinal slot 90. The cam lever 87 may be provided with a cam extension 91 having a cam bearing 92 which operates in the cam groove 93 of the cam disk 94 to thereby oscillate the cam lever and the pitman as the cam disk 94 rotates.

From this description it will be apparent that as the can e moves along the guide rail 27, it is brought in contact with the trip lever 30 which causes the lever arm 30' to move the horizontal slot of the pitman into engagement with bolt 95 on arm 96, to thereby cause this arm to swing on its axis 97, thus rocking gear 98 outwardly and causing pinion 98' to rotate and move the cover-projecting arm 85 and with it the cylinder 78. This movement causes the cover release and feed mechanism to operate as often as a can passes and releases the trip mechanism. To pivotally retract or re-set the trip a second, or re-set cam 99, is provided on the cam disk 94.

The entire mechanism is driven from a common source, or prime mover, which, for convenience, I have represented by a gear drive 100. Obviously any other source of power may be employed, if desired, and the power may be transmitted by a main gear drive consisting of a larger gear 101 and a smaller superimposed gear 102, and both gears are united by a common shafting, or otherwise, to rotate in unison.

The larger main gear meshes with an idler 103 which, in turn, drives gear 41 for operating the eccentric and the stamping mechanism. Besides this the main gear also operates gear 41' for driving the cam disk 94. The smaller main gear 102 meshes with a second idler 104 which, in turn, engages and drives gear 40 for operating the plungers and the chain of can moving disks. And the ratio of disk 40 to disks 41 and 41' is as 1 to 4, but obviously any other ratio may be selected, depending upon the number of cans to be capped and crimped during a single rotation of the can moving disks.

Figure 4:
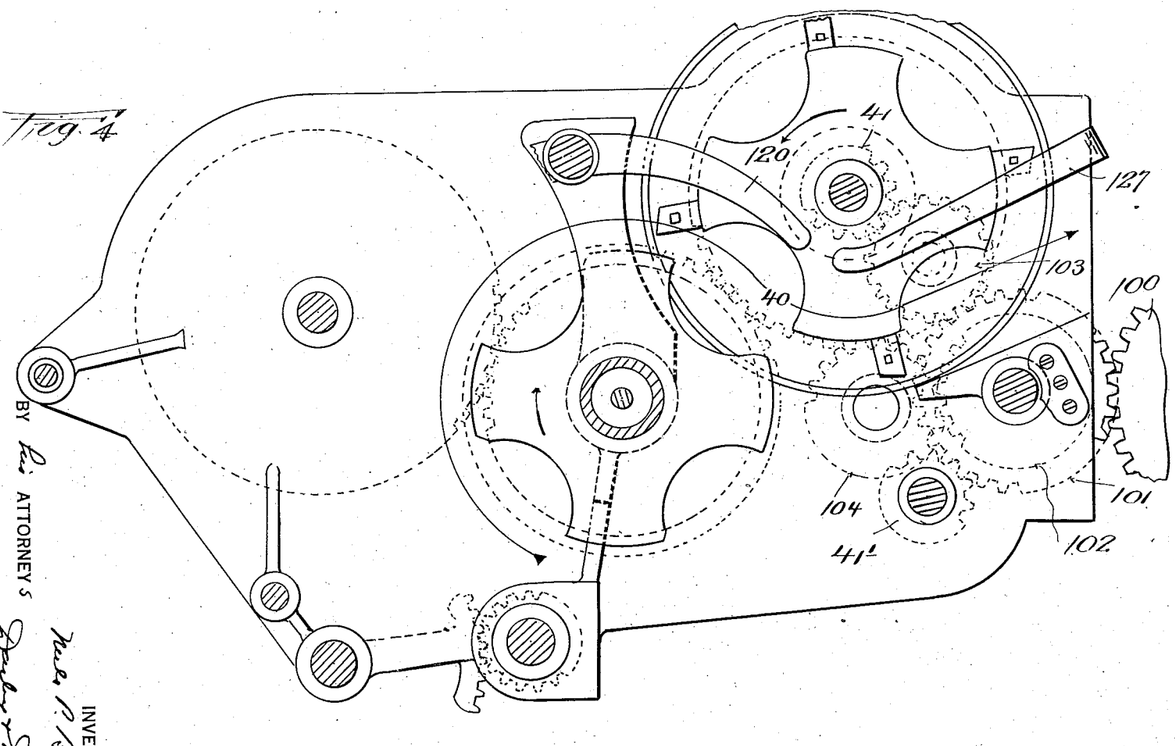
Fig. 4 is a view taken on lines 4—4 of Fig. 2, looking in the direction of the arrows.
Figures 5, 14, 15:
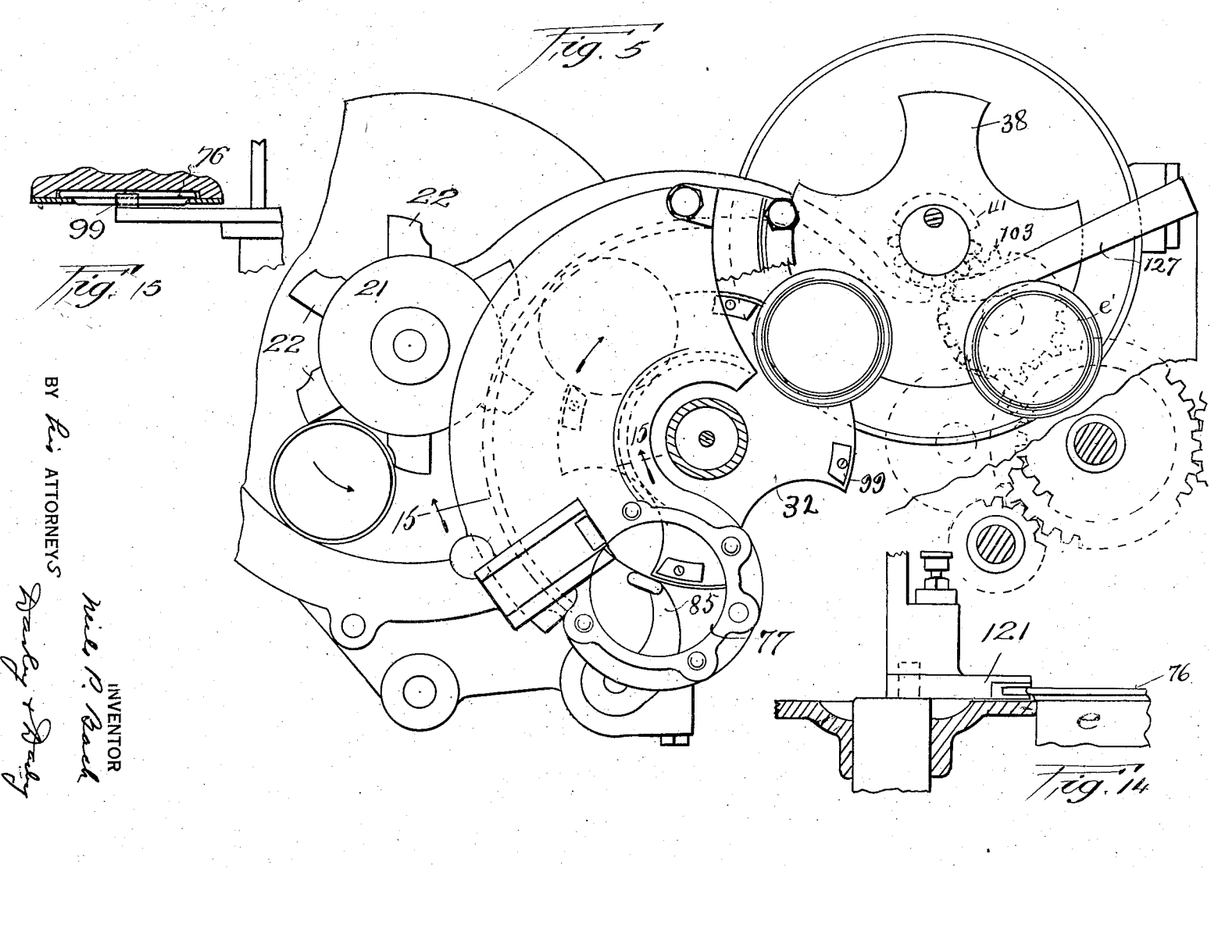
Fig. 5 is a plan view with certain parts removed.
Fig. 14 is a side view of crimper member and can to which the cover is loosely attached.
Fig. 15 is a view taken on lines 15—15 of Fig. 5.
Figures 6, 16, 17, 18:
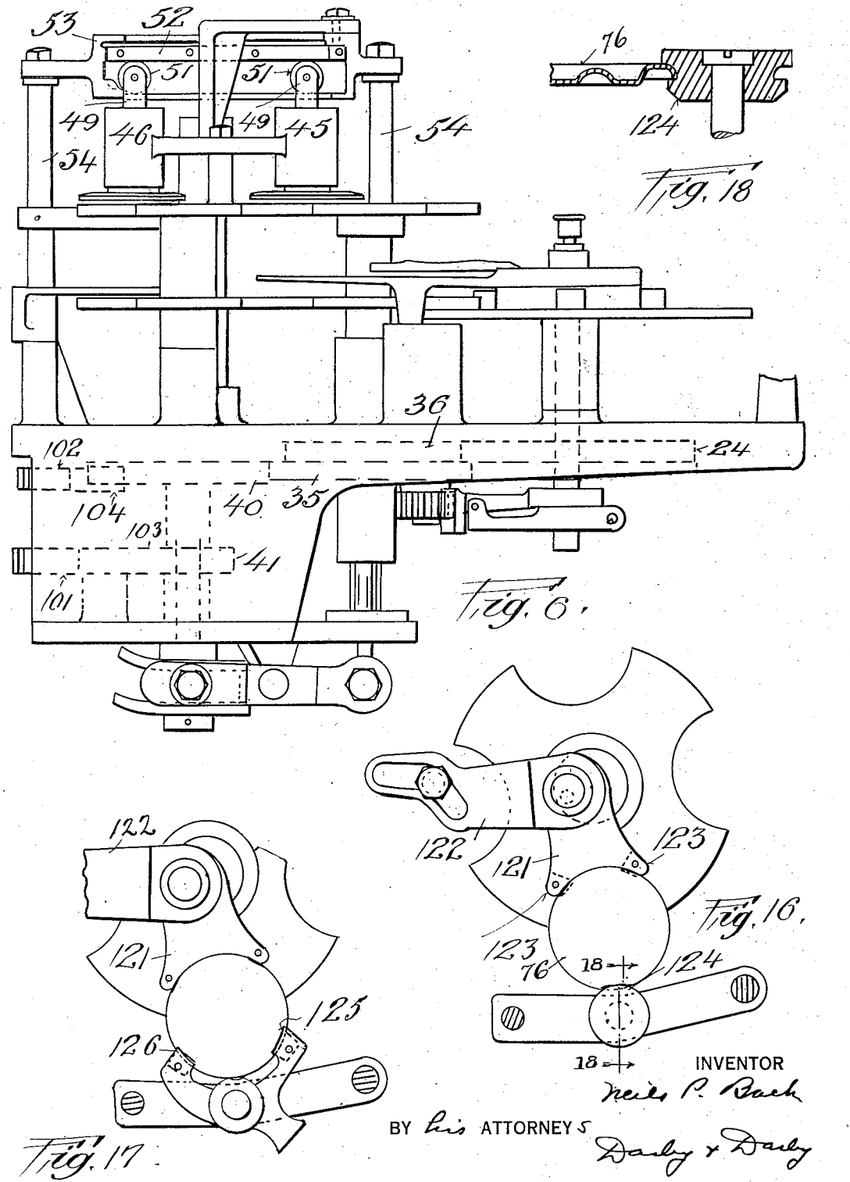
Fig. 6 is a rear elevation showing two of the plungers in position.
Fig. 16 is a plan view of the crimper mechanism shown in the act of crimping the cover at the points of contact.
Fig. 17 is a plan view of a modified form of crimper.
Fig. 18 is a view taken on lines 18—18 of Fig. 16.

The operation may briefly be summerized as follows: As the cans are fed at A onto the disk 20, they are spaced and moved by the spacer arms 22. As each can moves along the guide rail it depresses the trip lever 30 which causes the cover release and feed mechanism to release and place a cover under the marker for marking, in the manner stated, and while the can e moves on to the station B the cover has been released and marked, and by the time the can reaches B the cover is moved, by moving lug 99 on disk 32, on to the can, which is rounded and continues its travel to station C for temporarily fastening or crimping the cover. As is best shown in Fig. 4, the star disks for moving and shaping the cans coincide and as the can moves into station C guided by rail 120, it is rounded. The plunger gradually descends and the cover is pressed home. During these operations the can continues to move, and just before reaching the position indicated by C', the crimper 121, operated by the eccentric 72 and positioned by arm 122, causes the crimper jaws 123 and the crimper roller 124, or the rocker arms 125 and 126 of the modified form, to engage the edge of the cover and bend or crimp it over the edge of the can, as shown. The can then continues on its way out along the guide rail 127. The cans, filled with the goods to be sealed, and with the covers loosely but firmly secured in place, are now ready for the final processing and sealing and may be fed directly into a suitable processing and sealing machine, preferably of the continuous feed and sealing type.

While I have shown and described a specific embodiment of my invention, I do not thereby desire to be understood as thus unduly limiting myself, as obviously various modifications falling wholly within the scope and spirit of my invention will suggest themselves to those versed in the art.

What I claim, therefore, as new and useful, and of my own invention, and desire to secure by Letters Patent is:

1. In a can cap attaching machine, a can receiving station having can spacing means and a tripping mechanism operated by passing cans, a can cover supplying station having means for marking said covers, a cover attaching station, and means for attaching said covers to said cans while the cans continue their uninterrupted movement through said station.

2. In a cover attaching machine, a can receiving station having can spacing members for arranging the cans and an arm extending into the path of the cans, a can cover manipulating station having a cover marking device, a cover applying means, a cover attaching station, means for uniformly moving said cans through said stations, and cover attaching jaws in said cover attaching station, and an eccentric lever arm for rendering said jaws effective while the cans continue their course through the station.

3. In a cover attaching and marking machine, the combination of a succession of continuously rotating carrier disks having means for spacing and uniformly moving cans through said machine, a tripper arm extending into the path of the moving cans, means operable by said tripper arm for automatically supplying a cover to each passing can, crimper jaws for attaching said covers at intervals as the cans move through the machine, and an eccentric member for operating said jaws without retarding the movement of the cans.

4. In a cover attaching and marking machine, the combination of a succession of continuously rotating carrier members for moving cans through said machine, means operable by a passing can for releasing a cover for said can, means for marking said cover, means for placing said cover on said can, and crimper jaws for loosely uniting said can and cover at spaced points.

5. In a cover attaching machine, the combination of means for uniformly and continuously moving a succession of cans through said machine, means for applying a cover to each passing can, said last-named means comprising a selector feed cylinder provided with selector grooves and a selector finger for releasing a cover with each passing can, a stamp mechanism for marking said cover, and a crimper for attaching the cover to the cans at spaced points.

6. In a cover attaching and marking machine, the combination of means for uniformly and continuously moving a succession of cans through said machine in spaced relation, means for causing the release of a cover in synchronism with each passing can, said last-named means comprising a trip mechanism and a cam-operated release mechanism which is placed into operation by said trip mechanism for applying a cover to each passing can, and means for attaching said cover and can at spaced points.

7. In a cover attaching and marking machine, an intergeared succession of continuously rotating can moving and can spacing members, a cover feed mechanism, a trip operated by a passing can for placing into operation said cover feed mechanism, a member for marking said cover, said marker operating in synchronism with the can moving mechanism to mark each cover prior to being placed on the can and means for loosely attaching said cover to the can at spaced points.

8. In a cover attaching and marking machine, an intergeared succession of continuously rotating can moving and can spacing members, a cover feed mechanism for selectively supplying a cover to each passing can, a plunger for pressing the cover onto said moving can, said plunger moving in unison with the can and holding the cover, and crimpers for loosely attaching the cover at spaced points.

9. In a cover attaching and marking machine, an intergeared succession of continuously rotating can moving and can spacing members, a cover feed mechanism for selectively supplying a cover to each passing can, a plunger for pressing the cover onto the said moving can, said plunger moving in unison with the can and being gradually depressed, and an eccentric operating a crimper member for fastening without interrupting the movement of the can said cover onto said can at points spaced apart.

In testimony whereof I have hereunto set my hand on this 9th day of March A. D., 1922.

NEILS P. BACH.